United States Patent [19]

Yeager et al.

[11] Patent Number: 6,070,250
[45] Date of Patent: May 30, 2000

[54] WORKSTATION-BASED DISTRIBUTED PROCESS CONTROL SYSTEM

[75] Inventors: Robert L. Yeager, Pittsburgh; Warren A. Edblad, New Kensington, both of Pa.

[73] Assignee: Westinghouse Process Control, Inc., Pittsburgh, Pa.

[21] Appl. No.: 08/766,017

[22] Filed: Dec. 13, 1996

[51] Int. Cl.[7] .................................................. G06F 11/00
[52] U.S. Cl. ................................. 714/11; 714/4; 714/13
[58] Field of Search ........................ 395/182.02, 182.09, 395/182.11; 364/187, 132, 186, 900; 714/4, 11, 13

[56] References Cited

U.S. PATENT DOCUMENTS

| | | | |
|---|---|---|---|
| 3,636,331 | 1/1972 | Amrehn | 235/151.12 |
| 4,663,704 | 5/1987 | Jones et al. | 364/188 |
| 4,872,106 | 10/1989 | Galdun et al. | 364/900 |
| 5,058,056 | 10/1991 | Hammer et al. | 364/900 |
| 5,088,021 | 2/1992 | Mclaughlin et al. | 364/187 |
| 5,428,769 | 6/1995 | Glaser et al. | 395/575 |
| 5,485,590 | 1/1996 | Hyatt et al. | 395/442 |
| 5,570,291 | 10/1996 | Dudle et al. | 364/468.01 |
| 5,621,885 | 4/1997 | Del Vigna, Jr. | 395/182.11 |
| 5,737,514 | 4/1998 | Stiffler | 395/182.11 |

FOREIGN PATENT DOCUMENTS 566283  10/1993  European Pat. Off. ........ G05B 19/00

OTHER PUBLICATIONS

Westinghouse Electric Corporation, Descriptive Bulletin 21–156 entitled "WDPF Distributed Processing Unit," Dec., 1987, pp. 1–3.

Primary Examiner—Ayaz R. Sheikh
Assistant Examiner—Tim Vo
Attorney, Agent, or Firm—Marshall, O'Toole, Gerstein, Murray & Borun

[57] ABSTRACT

A distributed process control system drop for controlling the operation of an industrial process includes a first workstation or personal computer running industrial continuous process control software on an open architecture operating system and operable to analyze input information provided from the industrial process according to a predetermined set of rules and generate output information provided to the industrial process to control the operation thereof. A second workstation or personal computer connected with the first workstation via a non vendor-specific, international standards-based data highway normally runs in a backup mode and also runs the industrial process control software on an open architecture operating system to perform the same analysis as the first workstation and generate backup output information. A monitoring function associated with the second workstation detects a failure in the first workstation and transfers control of the industrial process to the second workstation upon first workstation failure. Both the first and second workstations include non-proprietary software suites and each suite includes individual software packages operable to permit personnel associated with the industrial process to interface with the industrial process in a selected manner through the first and second workstations.

20 Claims, 2 Drawing Sheets

WORKSTATION-BASED DISTRIBUTED PROCESS CONTROL SYSTEM

BACKGROUND OF THE INVENTION

1. Field of the Invention

The present invention relates generally to a distributed process control system for controlling the operation of an industrial process and, more particularly, to such a system which is workstation or personal computer-based and utilizes real time, bumpless transfer of control between running and backup workstations to achieve full process control system redundancy.

2. Description of the Relevant Art

Over the years process control systems have been enhanced and new systems developed to accommodate the ever increasingly sophisticated control demands of plant operations. For example, process control systems have been developed or enhanced to safely, efficiently and economically provide automated control for advanced steel manufacturing, chemical processing, power generation, water treatment applications and the like. A valuable feature of each of these process control systems is the capability for system expansion so that the control system may "grow" as the process being controlled grows, while at the same time not limiting the nature of the control processes available. Another valuable feature of these process control systems is that they are adaptable to a wide variety of industrial operations without requiring hardware modifications, i.e., they may be reconfigured by performing software modifications.

One of the earlier process control systems utilizes a central or "host" computer interfaced to local data acquisition and control devices. All decisions regarding the operation of the controlled process were made by the host computer. Although this system operated with some success, it had some major drawbacks. For example, utilizing a host computer in a process control system requires that the control system be predefined prior to its installation so that the precise arrangement of, for example, the communications between the host computer and the various processes controlled can be defined. Further, in such a process control system, a malfunction occurring within the host computer could adversely effect the operation of the entire control system and possibly cause the entire control system to fail.

In recognition of these drawbacks, process control systems were developed that moved away from the central/host computer configuration to a "distributed" control arrangement. In the distributed process control arrangement, the intelligence necessary to gather data and to take appropriate control action in response to such data is located in local "drops" distributed throughout the process which it controls so that central computers and the like are eliminated. In these distributed systems, all drops are connected by a single data highway. Each drop has allocated to it a specified time period during which it outputs various parameters it generates to the highway for acquisition by other drops, and another time period is provided in which all the drops may output other non-recurring data. Since this distributed control arrangement is modular in nature, it allows for the growth of the control system simply by adding new drops and further simplifies drop modifications required to meet process changes.

Although the distributed process control system approach provides an advancement in the art over control systems utilizing a host computer, the distributed process control system approach does, for some potential users, introduce control system limitations. For example, since all distributed process control systems and process control networks presently employ proprietary data processing hardware and associated software for actual process control (proprietary in the sense that such hardware and software are available only from the distributed process control system/vendor/provider), purchasers of such available distributed process control systems are prevented from using "off the shelf" or non-proprietary data processing hardware and other non-proprietary computer programs in conjunction with data processing hardware to effect process control. In addition, this same hardware is not typically used to perform other non-control operations such as data acquisition, data recording and archiving, spread sheet preparation, special process calculations and process control system modifications. As a result, additional, complementary system hardware is required to allow the user to view the process or to perform these other control system functions. Although the requirement of additional system hardware does not in all instances create a problem, for some applications the inclusion of this additional hardware increases the cost of the system to a level which makes the use of the system itself impractical.

As seen from the foregoing, presently available process control systems which utilize either a central or host computer or associated distributed process control arrangements are not without their shortcomings for some applications. Consequently, there is a need for an improved distributed process control system which may be used to control the operation of an industrial process which overcomes these shortcomings.

SUMMARY OF THE INVENTION

The present invention is directed to a distributed process control system designed to satisfy the aforementioned needs. The improved process control system of the present invention is a distributed control system so as to reap the benefits a modular system provides. In the distributed process control system of the present invention the use of proprietary data processing hardware (i.e. proprietary to the distributed process control system vendor/provider) heretofore utilized in each drop has been eliminated as has the use of the system provider's proprietary operating system software. In the distributed process control system of the present invention a non-proprietary platform such as a workstation or personal computer is employed in conjunction with an open architecture operating system and non-proprietary software packages in a redundant mode to permit industrial process operating and maintenance personnel with the uninterrupted ability to view the operation of the process and also perform other control system functions such as maintenance, records management and engineering functions. Utilizing redundant, non-proprietary software packages in conjunction with a workstation or personal computer platform running on an open architecture operating system eliminates the need for the additional hardware and associated proprietary software that had heretofore been used at the individual system drops to perform system viewing and other control system functions.

Accordingly, in conjunction with a distributed process control system including a plurality of drops at distributed locations each performing a selected function and a data highway for carrying data and means for connecting the plurality of drops in parallel to the data highway so that data representative of the selected function performed by each of the drops may be transmitted to and received by the remainder of the plurality of drops, the present invention is directed to a drop operable to control the operation of an industrial process. The drop includes: (a) I/O interface means communicating with various points located throughout the industrial process and operable to receive input information from each of the points representative of the operation of the industrial process; (b) a non-proprietary, first workstation running industrial process control software and connected with the I/O interface means to allow the industrial process control software to analyze the input information according to a predetermined set of rules and generate output information passed through the I/O interface means to the industrial process to control the operation thereof; (c) a non-proprietary, second workstation normally running in a backup mode also running the industrial process control software and connected with the I/O interface means to allow the industrial process software to analyze the input information according to the predetermined set of rules and generate backup output information; (d) monitoring means associated with the second workstation and connected with the first workstation to monitor the operation thereof, the monitoring means automatically causing the second workstation to operate in a controlling mode to pass the backup output information through the I/O interface means to the industrial process to control the operation thereof in the event the monitoring means detects a failure in the operation of the first workstation; and (e) a non-proprietary software suite loaded on the first workstation and including individual software packages each operable to permit personnel associates with the industrial process to interface with the industrial process in a selected manner through the first workstation.

These and other features and advantages of the present invention will become apparent to those skilled in the art upon a reading of the following detailed description when taken in conjunction with the drawing figures wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
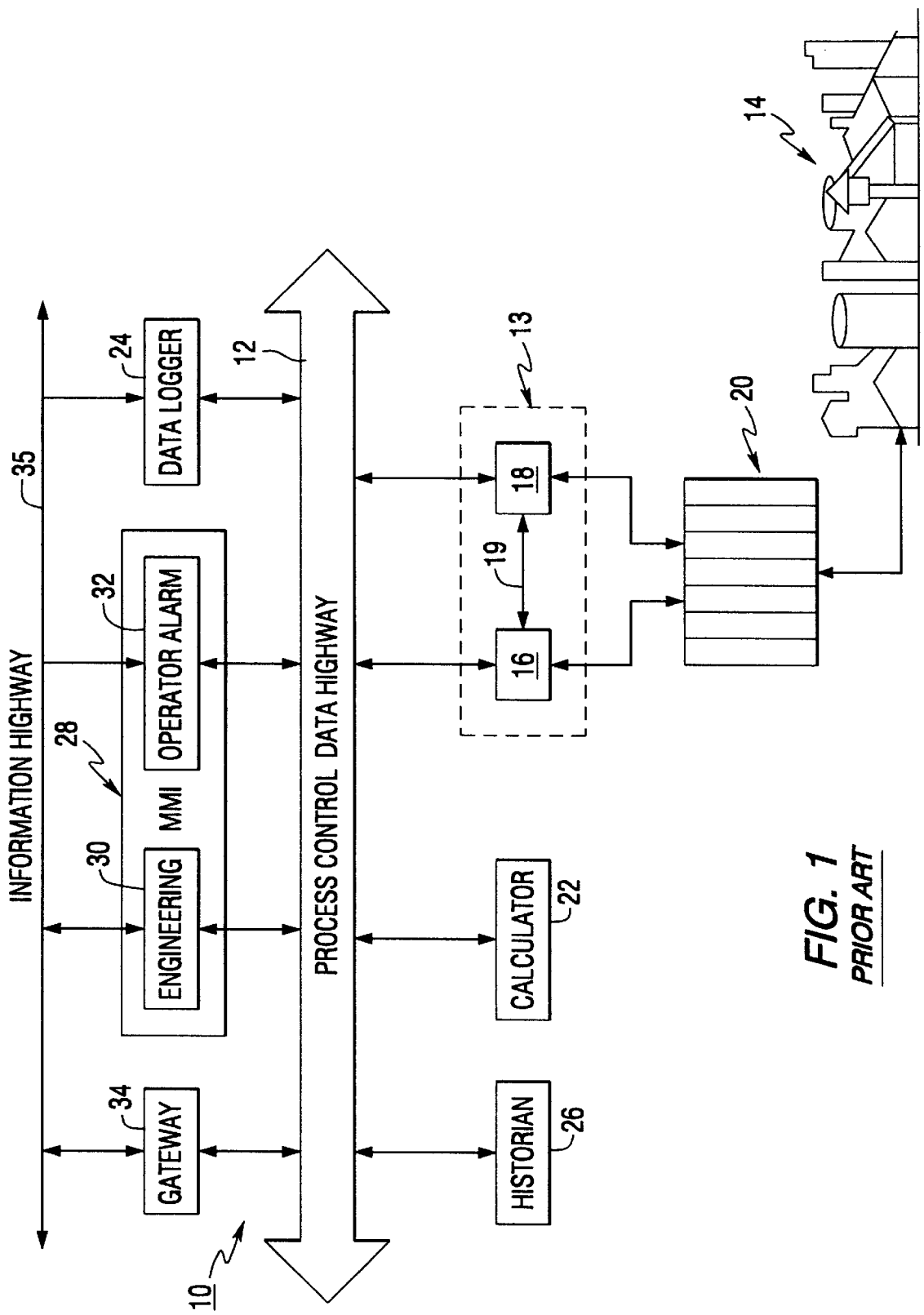
FIG. 1 illustrates in block diagram form a distributed process control system of the prior art, including individual drops interconnected via the control system provider's proprietary network hardware and/or software, a including drops such as a drop for controlling the operatic of an industrial process, and man-machine interface, data logger, historian and calculator drops all used by operating or maintenance personnel to view the operation of and interface with the industrial process.

As will be described herein, the present invention is directed to a distributed process control system wherein at least one of the system drops used to control an industrial process utilizes a commercially available workstation or personal computer running industrial process control software on an open architecture operating system and also running a "non-proprietary" software suite to perform other functions relative to the industrial process such as system monitoring, data and records management and engineering functions. This arrangement is advantageous since the ability of the control system of the present invention to employ an open architecture operating system and other non-proprietary software packages, and to combine the process control function with the human user interface function in a single package, gives operating and maintenance personnel the flexibility to select a wider variety of software packages than would otherwise be available with proprietary hardware/software control systems and to select software packages which are best suited for the desired application. In the preferred embodiment of the present invention, an industrial process control system drop includes a pair of workstations configured in a primary/backup arrangement s that the primary workstation operates to control the industrial process and serve as the human user interface while the backup workstation monitors the operation of the industrial process and also monitors the operation of the primary workstation. The backup workstation assumes control of the industrial process and provide a human user interface in the event the primary workstation fails for any reason or in the event it is desired to take the primary workstation off-line for reprogramming or repair. Both the primary and backup workstations are "non-proprietary" in the sense that they are not the proprietary design of the distributed control system vendor/provider but rather are commercially available from a number of workstation providers. Both the primary and backup workstations operate on an open architecture operating system and carry suites of non-proprietary, commercially available software which allow operating and maintenance personnel to interact with the industrial process through the primary and backup workstations. The use of open architecture operating systems and other suites of non-proprietary, widely available software packages greatly reduces the time required to train operating and maintenance personnel since these individuals most likely already have some experience with the software packages being utilized and also increases the available number of software packages which may be used in conjunction with workstations employed to control the industrial process. In addition, the use of non-proprietary software suites to perform human user interface functions residing on the same workstation used to control the operation of the industrial process allows control system designers to eliminate previously required control system drops which performed these human interface functions.

The Prior Art

In order to fully appreciate the novel features of the distributed process control system of the present invention reference is made to FIG. 1 wherein there is provided a block diagram illustration of a typical distributed process control system of the prior art generally designated by the numeral 10. In the prior art control system 10, a process control data highway 12 connects a plurality of drops which are arranged to perform varying functions. The process control data highway 12 is the proprietary design of and specific to the provider of the distributed process control system 10. As used herein the term "drop" means any of the various inputs and outputs to the data highway 12. Each drop comprises a proprietary processor for performing it's designated function, and the term "processor" refers to both the hardware and software at the drop location, connected by suitable means to the data highway 12. As with the data highway 12, each processor is the proprietary design of and specific to the vendor/provider of the distributed process control system 10. Proprietary processors may include, for example, a distributed processing unit 13 which performs data acquisition and control functions and interfaces with various industrial processes indicated generally at 14. The processing unit 13 includes a pair of individual, vendor-specific proprietary processors 16, 18. The processors 16, 18 are referred to as proprietary for the reasons stated above and further since each of the processors 16, 18 utilizes operating system software which is proprietary to the control system vendor. The processor 16 is referred to as the primary processor since it operates to actually control the industrial process 14. The primary processor 16 receives information from and provides information to the industrial process 14 through an input/output (I/O) interface device 20. The backup processor 18 monitors the operation of the primary processor 16 via the connection represented by the line 19 and the operation of the industrial process 14 via the I/O interface device 20. In the event the primary processor 16 fails for any reason or is taken off-line, the backup processor 18 detects the fact that the primary processor 16 has ceased functioning and immediately begins to monitor and control the operation of the industrial process 14.

As seen in FIG. 1, the prior art distributed process control system 10 includes a number of additional drops. For example, one of the drops may include a calculator function 22 to permit operating and maintenance personnel perform special calculations required to optimize the operation of the industrial process 14. Another drop may include a data logger 24 operable to record information generated, for example, during a production run of the industrial process. The data stored in the data logger 24 may be archived for later retrieval in an historian function designated by the numeral 26. A man-machine-interface (MMI) function 28 permits operating and maintenance personnel to interface directly with the various drops of the distributed control system 10, and includes an engineer's console 30 for permitting system programming and an operator's alarm console 32 for providing an image of the industrial process 14 and further providing audio and visual indicia of problems occurring within the industrial process 14. Another drop may provide a gateway function 34 for interfacing to some other computer or system. Each of the drops 22, 24, 26, 28 and 34 may, if desired, be connected with a non-proprietary information highway 35 for further data transfer.

It should be appreciated that the various drops described with respect to FIG. 1 are but examples of the types of drops which may be employed. It should also be appreciated, however, that all of the drops illustrated utilize both processors, processor operating systems and other software which are proprietary to the control system designer/vendor. This greatly limits the ability of the owner and operator of the industrial process to expand and alter the functions of the distributed processing system independent of the system designer.

The Present Invention

Figure 2:
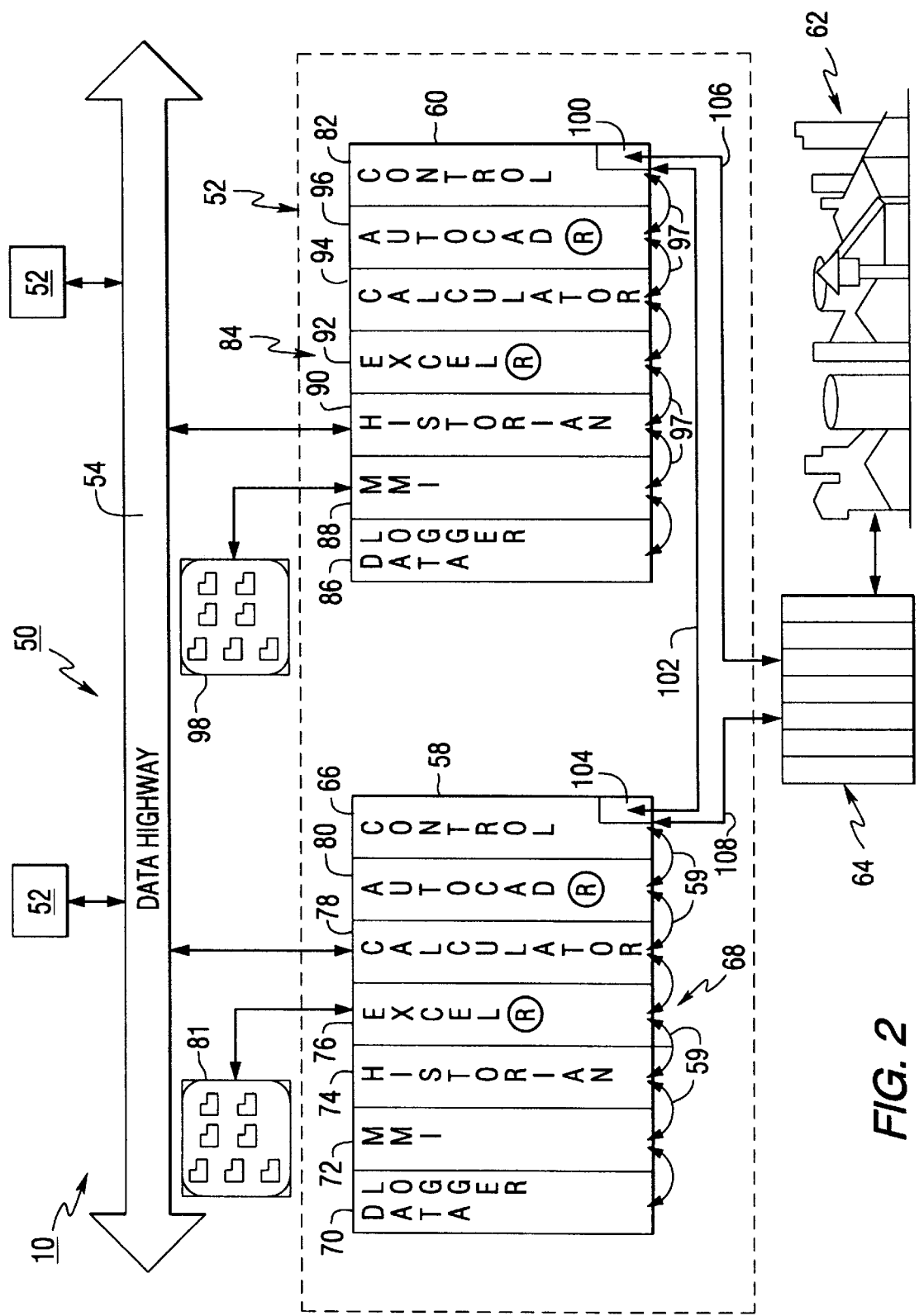
FIG.2 illustrates in block diagram form the distributed process control system of the present invention, including running and backup workstations attached to a non-proprietary, international standards-based and commercially available network, the workstations arranged to receive information from and provide information to an industrial process through an I/O interface and operable via non-proprietary software packages residing on the workstations themselves to allow operating or maintenance personnel to view the operation of and interface with the industrial process.

Now referring to FIG. 2, there is illustrated a distributed process control system generally designated by the numeral 50 having a number of drops 52 each of which is constructed in accordance with the present invention. As will be described herein, each of the drops 52 of the distributed process control system 50 utilizes a non vendor-specific workstation or personal computer (commercially available from a number of suppliers and may be connected with other drops 52 via an international standards-based network such as a data highway 54. Each of the drops 52 runs industrial process control software on an open architecture operationing system such as UNIX® (federally registered trademark of Novell, Inc., a Delaware corporation) or Windows NT® (federally registered trademark of Microsoft Corporation, a Washington corporation) and also runs "non-proprietary" software suite to perform other functions relative to the industrial process such as system monitoring, data records and management, and engineering functions. The use of an open architecture operating system permits the use of other non-proprietary software packages on the same workstation, thus providing operating and maintenance personnel the flexibility to select from a wider variety of software packages than would otherwise be available with existing proprietary hardware/software control systems. The use of workstation-based drops such as the drops 52 (one drop 52 illustrated in detail in FIG. 2) which utilize open architecture operating systems and other non-proprietary software packages permits operators of the industrial process to analyze software packages provided by a larger number of software suppliers, select the software package best suited for the desired application and expand and alter the functions of the distributed process control system independent of the system designer/provider.

Each of the drops 52 includes a primary workstation or personal computer 58 and, for purposes of the present invention, a backup workstation or personal computer 60. The primary and backup workstations 58, 60 are each connected with the other drops 52 via the non-proprietary, international standards-based data highway 54. In the drop 52 illustrated in detail in FIG. 2, the primary workstation 58 receives information from selected points in the industrial process 62 via an I/O interface device 64. Such information received by the primary workstation 58 is manipulated in a selected manner by control software resident on the primary workstation 58 and represented symbolically by the numeral 66. It should be understood that the configuration and operation of the control software 66 depends upon the nature of the industrial process 62.

The primary workstation 58 also includes a non-proprietary software suite generally designated by the numeral 68. The software suite 68 includes a number of individual non-proprietary or open architecture software packages each operable to permit personnel associated with the industrial process 62 to interface with the industrial process 62 in a selected manner through the primary workstation 58. Each of the software packages in the suite 68 is selected on the basis of it being able to co-exist with or communicate with the other software packages in the suite and with the control software 66 so that information may be transferred among software packages as required. In addition, each of the individual software packages in the suite 68 is selected for its ability to run concurrently with the other software packages in the suite and with the control software 66 on the primary workstation 58.

The ability of the various software packages to communicate with each other and with the control software 66 as required is represented symbolically by the bi-directional arrows 59. For example, the software suite 68 may include a data logger software package 70 operable to record selected input information generated during operation of the industrial process 62 and generate preformatted reports based on the selected input information. The software suite 68 may also include a man-machine-interface (MMI) software package 72 operable to permit operating personnel to monitor and respond to industrial process 62 alarms and for reprogramming various computer programs of the control software 66 utilized to implement the industrial process 62. The software suite 68 may further include an historian software package 74 operable to record the input information generated during operation of the industrial process 62 for archival storage purposes. A spreadsheet software package 76 such as Excel® (provided by Microsoft Corporation, a Washington corporation) may be included in the software suite 68 to permit various operating and maintenance personnel to chart selected trends related to the industrial process 62. The software suite 68 may also include a calculator package 78 operable to allow personnel associated with the industrial process 62 to perform special calculations required to optimize the operation of the process. Finally, the software package 68 may include a drafting package 80 such as AutoCad® (provided by AutoDesk Corporation, a Washington corporation) operable to permit the industrial process to be configured based on changes in process requirements. Each of the software packages 66, 70–80 is preferably represented graphically on a CRT screen 81 by some form of well-known folder or other icon scheme (Objects) and may be opened by operating personnel as needed.

In the drop 52 illustrated in detail, the backup workstation 60 is identical to the primary workstation 58 and also receives information from selected points located throughout the industrial process 62 via the I/O interface device 64. Such information received by the backup workstation 60 is manipulated in the same selected manner as manipulated by primary workstation 58. Such manipulation is done by control software resident on the backup workstation 60 and represented symbolically by the numeral 82. It should be understood that the configuration and operation of the control software 82 is identical to the configuration and operation of the control software 66.

The backup workstation 60 also runs on an open architecture operating system and includes a non-proprietary software suite generally designated by the numeral 84. The software suite 84 is identical to the software suite 68 and therefore includes the same non-proprietary software packages described with respect to software suite 68. The software packages in the Software Suite 84 are operable to permit personnel associated with the industrial process 62 to interface with the industrial process 62 in a selected manner through the backup workstation 60. Thus, as illustrated in FIG. 2, the software suite 84 includes a data logger software package 86, a man-machine-interface (MMI) software package 88, an historian software package 90, a spreadsheet software package 92, a calculator software package 94 and a drafting software package 96. The ability of the various software packages 86–96 to communicate with each other and with the control software 82 as required is represented symbolically by the bi-directional arrows 97. Each of the software packages 82, 86–96 is represented graphically on a CRT screen 98 by some form of well-known folder or other icon scheme (Objects) and may be opened by operating personnel as needed.

As previously described, during normal operation of the distributed process control system 50, the primary workstation 58 operates to control the operation of the industrial process 62 by monitoring information provided from the industrial process 62 through I/O interface device 64, manipulating such information according to a predetermined set of rules utilizing the control software 66 resident on the primary workstation 58 and thereafter providing output information passed through the I/O interface 64 to the industrial process 62 to control the operation thereof. The backup workstation 60 includes a monitoring function illustrated generally at 100 connected via line 102 to a monitoring function 104 of the primary workstation 58. The line 102 connecting the primary and backup workstations 58, 60 is preferably a non vendor specific, international standards-based data highway. The backup workstation 60 also monitors the operation of the industrial process 62 on line 106 since it also receives the same information that is passed through the I/O interface device 64 to the primary workstation 58. The backup workstation 60 performs the same data manipulation as the primary workstation 58 and according to the same predetermined set of rules utilizing control software 82. As workstation 60 is normally in a backup mode the backup output information generated by workstation 60 is not provided to the I/O interface device 64. However, when the monitoring function 100 of the backup workstation 60 detects a failure of the primary workstation 58 as evidenced by a lack of information flowing from the primary workstation 58 to the I/O interface device 64 on line 108, the backup workstation 60 immediately assumes control of the industrial process 62 by providing the backup output information it generates to the I/O interface device 64 via the line 106. In this manner, the failover from the primary workstation 58 to the backup workstation 60 is "bumpless" in that control of the industrial process 62 continues uninterrupted. It should be understood that references to the workstations 58, 60 as primary and backup, respectively, is done solely for purposes of discussion and either workstation may at any given time be the primary workstation and the other the backup workstation. Thus, for example, if the backup workstation 60 is actually controlling the industrial process 62 and the primary workstation 58 is serving in a backup capacity, the monitoring function 104 of the primary workstation 58 will detect a failure of the backup workstation 60 as evidenced by a lack of information flowing from the backup workstation 60 to the I/O interface device 64 on line 106. When this failure and detection occurs, the primary workstation 58 immediately takes over control of the industrial process 62 by providing its output information to the I/O interface device 64 via the line 108.

Whereas a particular embodiment of this invention has been described for purposes of illustration, it will be apparent to those of ordinary skill in the art that numerous variations in details may be made without departing from the invention as described in the appended claims.

We claim:

1. In a distributed process control system including a plurality of drops at distributed locations each performing a selected function and a data highway bus for carrying data and means for connecting said plurality of drops in parallel to said bus so that data representative of the selected function performed by each of said drops may be transmitted to and received by the remainder of said plurality of drops, at least one drop for controlling the operation of a continuous process, said one drop comprising:

(a) I/O interface means connected with various points located throughout said continuous process and operable to receive input information from each of said points representative of the operation of said continuous process;

(b) a first workstation running continuous process control software and connected with said I/O interface means to allow said continuous process control software to analyze said input information according to a predetermined set of rules and generate output information passed through said I/O interface means to said continuous process to control the operation thereof;

(c) a second workstation normally running in a backup mode also running said continuous process control software and connected with said I/O interface means to allow said continuous process control software to analyze said input information according to said predetermined set of rules and generate backup output information;

(d) monitoring means associated with said second workstation and connected with said first workstation to monitor the operation thereof, said monitoring means automatically causing said second workstation to operate in a controlling mode to pass said backup output information through said I/O interface means to said continuous process to control the operation thereof in the event said monitoring means detects a failure in the operation of said first workstation; and (e) a non-proprietary software suite loaded on said first workstation and including individual software packages each operable to permit personnel associated with said continuous process to interface with said continuous process in a selected manner through said first workstation.

2. The drop for controlling the operation of a continuous process as recited in claim 1, wherein said non-proprietary software suite is also loaded on said second workstation to permit personnel associated with said continuous process to interface with said continuous process in said selected manner when said second workstation is in said backup mode and also in said controlling mode.

3. The drop for controlling the operation of a continuous process as recited in claim 1, wherein said first and second workstations are personal computers.

4. The drop for controlling the operation of a continuous process as recited in claim 3, wherein said first and second workstations each utilize an open architecture operating system.

5. The drop for controlling the operation of a continuous process as recited in claim 1, wherein each of said individual software packages in said non-proprietary software suite is capable of co-existing with the other software packages in said suite so that data generated during the operation of one of said software packages may be shared with each of the other individual software packages in said suite.

6. The drop for controlling the operation of a continuous process as recited in claim 5, wherein said non-proprietary software suite includes a data logger software package operable to record selected input information generated during operation of the continuous process and generate preformatted reports based on said selected input information.

7. The drop for controlling the operation of a continuous process as recited in claim 5, wherein said non-proprietary software suite includes an historian software package operable to record said input information generated during operation of the continuous process for archival storage purposes.

8. The drop for controlling the operation of a continuous process as recited in claim 5, wherein said non-proprietary software suite includes a calculator software package operable to provide special calculations required to optimize the operation of the continuous process.

9. The drop for controlling the operation of a continuous process as recited in claim 5, wherein said non-proprietary software suite includes a spreadsheet software package operable to generate spreadsheets for illustrating selected trends related to the continuous process.

10. The drop for controlling the operation of a continuous process as recited in claim 5, wherein said non-proprietary software suite includes a drafting software package operable to permit the continuous process to be reconfigured based on changes in process requirements.

11. The drop for controlling the operation of a continuous process as recited in claim 5, wherein said non-proprietary software suite includes a man-machine-interface software package operable to permit operating personnel to monitor and respond to continuous process alarms and for reprogramming various computer programs utilized to implement the continuous process.

12. In a distributed process control system including a plurality of drops at distributed locations each performing a selected function and a data highway bus for carrying data and means for connecting said plurality of drops in parallel to said bus so that data representative of the selected function performed by each of said drops may be transmitted to and received by the remainder of said plurality of drops, at least one drop for controlling the operation of a continuous process, said one drop comprising:

(a) I/O interface means connected with various points located throughout said continuous process and operable to receive input information from each of said points representative of the operation of said continuous process;

(b) a workstation running continuous process control software and connected with said I/O interface means to allow said continuous process control software to analyze said input information according to a predetermined set of rules and generate output information passed through said I/O interface means to said continuous process to control the operation thereof; and (c) a non-proprietary software suite loaded on said workstation and including individual software packages each operable to permit personnel associated with said continuous process to interface with said continuous process in a selected manner through said workstation.

13. The drop for controlling the operation of a continuous process as recited in claim 12, wherein said workstation utilizes an open architecture operating system.

14. The drop for controlling the operation of a continuous process as recited in claim 12, wherein each of said individual software packages in said non-proprietary software suite is capable of co-existing with the other software packages in said suite so that data generated during the operation of one of said software packages may be shared with each of the other individual software packages in said suite.

15. The drop for controlling the operation of a continuous process as recited in claim 14, wherein said non-proprietary software suite includes a data logger software package operable to record selected input information generated during operation of the continuous process and generate preformatted reports based on said selected input information.

16. The drop for controlling the operation of a continuous process as recited in claim 14, wherein said non-proprietary software suite includes an historian software package operable to record said input information generated during operation of the continuous process for archival storage purposes.

17. The drop for controlling the operation of a continuous process as recited in claim 14, wherein said non-proprietary software suite includes a calculator software package operable to provide special calculations required to optimize the operation of the continuous process.

18. The drop for controlling the operation of a continuous process as recited in claim 14, wherein said non-proprietary software suite includes a spreadsheet software package operable to generate spreadsheets for illustrating selected trends related to the continuous process.

19. The drop for controlling the operation of a continuous process as recited in claim 14, wherein said non-proprietary software suite includes a drafting software package operable to permit the continuous process to be reconfigured based on changes in process requirements.

20. The drop for controlling the operation of a continuous process as recited in claim 14, wherein said non-proprietary software suite includes a man-machine-interface software package operable to permit operating personnel to monitor and respond to continuous process alarms and for reprogramming various computer programs utilized to implement the continuous process.

\* \* \* \* \*